3,775,506
METHOD OF PREPARING A HYDROGENATION CATALYST
William L. Houston, Jr., and William C. Clark, Sweeny, Tex., assignors to Phillips Petroleum Company
No Drawing. Continuation of abandoned application Ser. No. 886,409, Dec. 18, 1969. This application June 7, 1971, Ser. No. 150,817
Int. Cl. C07c *5/02, 5/10;* C10g *23/02*
U.S. Cl. 260—677 H                                   7 Claims

ABSTRACT OF THE DISCLOSURE

A method of preparing a hydrogenation catalyst, comprising: pressurizing the catalyst at ambient temperature with a nonreactive gas to hydrogenation pressure and then increasing the temperature to hydrogenation conditions.

---

This application is a continuation of Ser. No. 886,409, filed Dec. 18, 1969, now abandoned.

This invention relates to a method of preparing a catalyst for hydrogenation operations.

The selective hydrogenation removal of acetylenes from olefinic gases has received concentrated attention from the industry. The industry through this attention has developed several hydrogenation catalysts most of which are of a reduced noble metal variety. The selective hydrogenation of acetylenes from olefinic gas streams requires a balancing of pressure, temperature and residence time for satisfactory reaction completion. Major problems arising in the start-up procedure of such a hydrogenation reaction catalyst are due to exothermic temperature control and excessive residence time. Experience has shown that runaway exothermic temperatures cause a loss in catalyst selectivity before actual hydrogenation conditions are reached. Operational conditions can be maintained after start-up by various methods, but bringing a hydrogenation catalyst to operational conditions without adversely affecting selectivity continues to be an unanswered challenge.

An object of this invention is to start-up a selective hydrogenation process without uncontrolled temperature rise.

Another object of this invention is to start up a selective hydrogenation process without reducing catalytic selectivity.

These and other objects, aspects and advantages of this invention will be apparent to one skilled in the art upon further study of this disclosure, and the appended claims.

I have found that partially pressurizing the catalyst with an inert gas and then with a nonreactive saturated hydrocarbon before introducing the olefinic feedstream to the hydrogenation catalyst allows satisfactory start-up. According to the invention a selective hydrogenation catalyst is purged with nitrogen or other inert gases. The hydrogenation catalyst is further pretreated by contacting the catalyst with carbon monoxide under an inert gas atmosphere between the purge step and the pressurizing steps. The hydrogenation catalyst is pressurized first with an inert gas and then with a saturated hydrocarbon up to operational pressures at ambient temperature. Then the feedstream is introduced and the operating temperature increased to the necessary level to obtain the desired hydrogenation reaction. Pressurizing the hydrogenation catalyst with a relatively pure gas, for example ethane, serves two functions: (1) bringing the hydrogenation catalyst environment up to operational pressures without exothermic reactions, and (2) prevents the possible leakage of reactor processor gas or contaminants into the hydrogenation catalyst environment prior to introducing the feedstream to the hydrogenation catalyst. An unstable operation flowing from the start-up would be most difficult to eliminate later under hydrogenation operating conditions.

Another variable, residence time, also has a major influence upon the reaction completion. In fact, residence time under the above selective hydrogenation reaction conditions becomes a critical control factor. Selective hydrogenation, as in removing acetylene from olefinic gases, is an excellent example wherein pressure, temperature, and residence time all have a critical influence upon the hydrogenation process.

A very large number of variable factors exist in starting and controlling a selective hydrogenation operation. With so many variables, the magnitude of the total task of accessing the relevance of each variable to the reaction is not easily managed. It is therefore desirable to consider carefully what simplifications are possible in the starting up and operation of a selective hydrogenation process. Residence time of this hydrogenation operation is controlled at about 20 seconds. Under the above-discussed start-up procedures and controlled residence time, an acetylene content in the feedstream of about 1200 p.p.m. is reduced to less than 3 p.p.m. by selective hydrogenation. The acetylene is removed from an olefinic gas stream which contains from about 25 to 35 mol percent concentrations, ethylene, without appreciable reaction between the hydrogen and the ethylene.

The invention is applicable to a variety of hydrogenation catalyst systems. There are at least 15 metals and a very large number of alloys which will catalyze the hydrogenation of the many types of unsaturated hydrocarbons; although nickel, palladium, and platinum have received most of the industry's attention. Each metal may be used in one of a number of forms: (1) macroscopic, which includes wires, foils and granules; (2) microscopic, which includes powders, smokes, colloidal suspensions, and condensed metal films; (3) supported forms, where the metal in varying concentration is dispersed to a varying degree with another more or less inert substance, usually an irreducible metal oxide or salt. All of the metals of Group VIII catalyze the hydrogenation of acetylene. A specific example of these catalysts would be palladium upon an alumina support either as a surface coated palladium on alumina pellets or impregnated alumina which was impregnated during extrusion of the alumina through the use of a palladium solution.

The purging and low level pressurizing of the hydrogenation catalyst environment can be accomplished with an inert gas, for example nitrogen. The hydrogenation catalyst may be also treated with carbon monoxide so that when the process gas enters the reactor it will not lose carbon monoxide to the catalyst bed and result in a hot spot deactivation. A saturated hydrocarbon of two or less carbon atoms per molecule is used to replace the inert gas and to achieve final required pressure levels. The saturated hydrocarbon of two carbon atoms per molecule or less should be of at least 98 percent purity with allowable traces of methane or propane as impurities.

The inert gas, for example nitrogen, is used for purging the hydrogenating catalyst and pressurizing said catalyst from 50 to 100 p.s.i.g. during a time period of less than one hour depending on convenience. The saturated hydrocarbon pressurizing stage which brings the hydrogenation catalyst environment up to hydrogenation pressures of at least 300 p.s.i.g. is performed in one or more hours depending upon the needs of the individual operations. The pressuring up operation can be accomplished in one or more hours depending upon the equipment used.

SPECIFIC EXAMPLE OF PLACING ACETYLENE HYDROGENATION REACTOR IN SERVICE (1) The reactor is placed under vacuum for removal of all possible gaseous impurities and oxygen.

(2) Purge the reactor with nitrogen, then under a nitrogen atmosphere vent samples can be taken for impurity inspection.

(3) When the purge vent gas is satisfactorily free of impurities, then pressure reactor from 5 to 10 p.s.i.g. with nitrogen.

(4) The hydrogenation catalyst is then contacted with carbon monoxide.

(5) Pressurize the hydrogenation catalyst with nitrogen from 50 to 100 p.s.i.g. then pressurize to about 350 p.s.i.g. with ethane of at least 98 percent purity by volume.

(6) Introduce the feedstream to the hydrogenation catalyst at temperatures below 100° F. and increase in very small increments until a temperature rise across the catalyst is achieved. Upon the occurrence of the temperature rise across the catalyst have the reactor effluent inspected until less than 4 p.p.m. of the acetylene remains. If the required less than 4 p.p.m. acetylene content in the reactor effluent is not achieved at the first initial temperature rise then continue temperature increases for reaction completion.

Other modifications and alterations of this invention will become apparent to those skilled in the art from the foregoing discussion and example, and it should be understood that this invention is not to be unduly limited thereto.

What we claim is:

1. A method of placing in operation a hydrogenation reactor containing a Group VIII metal catalyst, which comprises:
 (a) purging and pressuring said reactor with an inert gas to the range of 50 to 100 p.s.i.g.;
 (b) pressuring the resulting purged reactor with a normal paraffin hydrocarbon selected from the group consisting of methane and ethane to a pressure of at least 300 p.s.i.g.;
 (c) introducing a hydrogenatable feedstream and hydrogen into said reactor; and
 (d) increasing the temperature and pressure of said feedstream to bring said reactor up to an elevated temperature and pressure at which hydrogenation of said feedstream occurs.

2. The method of claim 1 in which the hydrogenatable feedstream contains acetylenes.

3. The method of claim 1 in which carbon monoxide is introduced into said reactor after said reactor is purged with said inert gas.

4. The method of claim 1 in which said inert gas is nitrogen.

5. The method of claim 1 in which said n-paraffin hydrocarbon is methane.

6. The method of claim 1 in which said n-paraffin hydrocarbon is ethane.

7. The method of claim 1 in which said catalyst comprises palladium supported on alumina and said n-paraffin hydrocarbon comprises a stream containing at least 98 volume percent ethane.

References Cited

UNITED STATES PATENTS

| | | | |
|---|---|---|---|
| 3,253,047 | 5/1966 | Bellinger | 260—683.9 |
| 3,253,048 | 5/1966 | Cabbage | 260—683.9 |
| 3,291,722 | 12/1966 | Taylor et al. | 260—143 |
| 3,471,400 | 10/1969 | Cosyns et al. | 208—143 |

DELBERT E. GANTZ, Primary Examiner

G. J. CRASANAKIS, Assistant Examiner

U.S. Cl. X.R.

208—143; 260—683.9